(12) United States Patent
Sugiyama et al.

(10) Patent No.: US 7,538,791 B2
(45) Date of Patent: May 26, 2009

(54) COLOR MONITOR WHITE CHROMATICITY MEASURING DEVICE

(75) Inventors: Tohru Sugiyama, Tokyo (JP); Tsutomu Nakagawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 730 days.

(21) Appl. No.: 10/559,854

(22) PCT Filed: Jun. 11, 2004

(86) PCT No.: PCT/JP2004/008591

§ 371 (c)(1),
(2), (4) Date: Dec. 7, 2005

(87) PCT Pub. No.: WO2004/114682

PCT Pub. Date: Dec. 29, 2004

(65) Prior Publication Data

US 2006/0164513 A1 Jul. 27, 2006

(30) Foreign Application Priority Data

Jun. 24, 2003 (JP) .............................. 2003-179241

(51) Int. Cl.
 *H04N 17/02* (2006.01)
(52) U.S. Cl. ...................................... 348/189; 348/180
(58) Field of Classification Search ......... 348/180–182, 348/184, 189, 191, 658, 655; 345/622; *H04N 17/00, H04N 17/02*

See application file for complete search history.

(56) References Cited

U.S. PATENT DOCUMENTS 5,754,222 A * 5/1998 Daly et al. .................. 348/184

(Continued)

FOREIGN PATENT DOCUMENTS

JP 05-176352 A 7/1993

(Continued)

OTHER PUBLICATIONS

U.S. Appl. No. 10/559,853.

*Primary Examiner*—Sherrie Hsia
(74) *Attorney, Agent, or Firm*—Ladas & Parry LLP

(57) ABSTRACT

The white chromaticity, in which the illumination environment is considered, is measured for each individual color monitor (100). A reference body (Q), comprising a perfect diffuser, is applied on the screen of the color monitor (100). By a test pattern display means (210), a test pattern (T) is displayed on the screen of the color monitor (100) based on tone values of the three primary colors R, G, and B that are stored in a tone value storage means (220). While fixing the tone value of the primary color R at 255, the tone values of the primary colors G and B are varied cyclically from 0 to 255 in a prescribed period by a tone value varying means (240). An operator inputs the result of comparing the color of the test pattern (T) and the color of the reference body (Q). When a comparison result indicating the matching of the two is input, a comparison result entering means (230) outputs an agreement signal. A measurement result output means (250) outputs, as the measurement results indicating the white chromaticity based on the reference body (Q), the tone values of the three primary colors R, G, and B that are stored in the tone value storage means (220) at the point at which the agreement signal is provided.

16 Claims, 4 Drawing Sheets

U.S. PATENT DOCUMENTS 6,686,953 B1 * 2/2004 Holmes ..................... 348/181

FOREIGN PATENT DOCUMENTS

| JP | 10-173943 | 6/1998 |
| JP | 2000-29444 | 1/2000 |
| JP | 2002-333874 A | 11/2002 |

* cited by examiner

COLOR MONITOR WHITE CHROMATICITY MEASURING DEVICE

TECHNICAL FIELD

This invention relates to a white chromaticity measuring device for color monitor, and particularly relates to a device for determining, by visual recognition, the white chromaticity, under a predetermined illumination environment, of a color monitor having a function of displaying color images using the three primary colors R, G, and B.

BACKGROUND ART

Generally, the display characteristics of monitors (display devices) differ according to each individual product, and in the case of use upon connection to a personal computer, etc., corrections are preferably carried out in accordance with the individual display characteristics. To carry out such corrections, the display characteristics of each individual monitor must be measured and the results must be prepared as objective data in advance. Normally, such data are referred to as the profile data of each individual monitor. In connecting a monitor to a personal computer, by installing the profile data of the monitor in the personal computer, corrections based on the profile data are enabled and universal display results that are not affected by the display characteristics unique to the individual monitor can be obtained.

The representative display characteristics of a color monitor having a function of displaying color images using the three primary colors R, G, and B are the chromaticities of the three primary colors, the white chromaticity, and the tone reproduction characteristics. Here, the white chromaticity is determined as the tone values of the three primary colors R, G, and B that are required to make an individual color monitor perform a white display. When an application program, which is operating on the personal computer, is to make white be displayed on the monitor, the tone values of the three primary colors R, G, and B that have been determined as the white chromaticity are provided to the monitor.

This white chromaticity can be determined by a physical measurement using an optical measuring device, and in many cases with a general, commercial color monitor, the white chromaticity measured in the shipping process is attached as monitor profile data. Also recently, a method of determining the white chromaticity, wherein a special measuring device is not used and a dedicated program is installed in a personal computer, etc., connected to the monitor, has been proposed. For example, Japanese Unexamined Patent Publication No. 2000-029444 discloses a method of measuring the white chromaticity by visual recognition by an operator.

As mentioned above, by preparing monitor profile data indicating the white chromaticity for each individual monitor and performing correction of the white display characteristics based on the profile data, a universal white display that is not affected by the display characteristics unique to each individual monitor can be performed. However, conventional profile data represent the physical white display characteristics of each individual monitor itself and do not indicate the visual perception characteristics as viewed by an operator when the monitor is placed under a specific illumination environment. Thus though for a plurality of color monitors used under the same illumination environment, substantially the same white reproduction characteristics are obtained by correction of the white display characteristics using monitor profile data indicating the white chromaticity measured by a conventional method, the same white reproduction characteristics cannot be obtained for the plurality of color monitors when they are used under different illumination environments. This presents major problems in terms of practical use.

For example, generally in a DTP process for preparing commercial printed matter, several staff members view color monitors to carry out tasks that are divided among them. However, the illumination environments of the rooms in which the respective staff members work will not necessarily be the same. For example, the working environment of an editor inside a publishing firm will normally differ as a matter of course from the working environment of a designer of an external design office. Specifically, each individual illumination environment will differ significantly according to whether the indoor illumination is a fluorescent lamp or a light bulb, the color of the wallpaper in the room, whether or not sunlight shines in, etc. In such cases, even if correction based on the white chromaticity measured by a conventional method (the pure white chromaticity of each monitor) is performed, the white color that each staff member views on the monitor will differ due to being influenced by the corresponding illumination environment. Though measurement of white that takes the illumination into consideration can be made using a measuring device that can make calorimetric measurements in a non-contacting manner (for example, the PR-705 spectroradiometer, made by Photo Research Inc.), such a measuring device is expensive and not suited for general use.

An object of this invention is thus to provide a white chromaticity measuring device for color monitor that enables the white chromaticity, in which the illumination environment of the installation location is considered, to be measured readily.

DISCLOSURE OF INVENTION (1) The first feature of the present invention resides in a device for measuring a white chromaticity of a color monitor, having a function of displaying color images using the three primary colors of R, G, and B, the measuring device comprising:

a tone value storage means, storing a combination of tone values of the three primary colors R, G, and B;

a test pattern display means, displaying a test pattern on a screen of a color monitor based on the tone values of the three primary colors R, G, and B that are stored in the tone value storage means;

a tone value varying means, performing a varying operation of varying, with time and in accordance with prescribed rules that are determined in advance, the tone values stored in the tone value storage means;

a comparison result entering means, inputting, from an operator viewing the test pattern displayed on the screen of the color monitor in a state in which the varying operation by the tone value varying means is being performed, a comparison result, for which a color of a "reference body indicating white that serves as a reference" that is positioned near the test pattern and a color of the test pattern are the objects of comparison; and a measurement result output means, outputting, as a measurement result indicating the white chromaticity of the color monitor under a present illumination environment and based on the reference body, the combination of the tone values of the three primary colors R, G, and B that are stored in the tone value storage means at a point at which a comparison result, indicating that the objects of comparison are matched, is input into the comparison result entering means.

(2) The second feature of the present invention resides in a white chromaticity measuring device for a color monitor according to the first feature, wherein the tone value varying means has a function of starting and stopping, in accordance with variation instructions provided from an operator, a varying operation of adding or subtracting a prescribed variation amount to or from a tone value of a prescribed primary color in a prescribed period.

(3) The third feature of the present invention resides in a white chromaticity measuring device for a color monitor according to the first or second feature, wherein the tone value varying means keeps a tone value of the primary color R, among the three primary colors R, G, and B, fixed always at a maximum tone value and carries out the varying operations only on tone values of the primary color G and the primary color B.

(4) The fourth feature of the present invention resides in a white chromaticity measuring device for a color monitor according to the first to third features, wherein the tone value varying means has a function of performing a varying operation of adding or subtracting a prescribed variation amount to or from a tone value of a specific primary color to be varied in a prescribed period and switching the specific primary color to be subject to variation in accordance with the comparison result input into the comparison result entering means.

(5) The fifth feature of the present invention resides in a white chromaticity measuring device for a color monitor according to the first feature, wherein the tone value varying means is provided with a function of selectively performing a green varying operation of adding or subtracting a prescribed variation amount to or from a tone value of the primary color G in a prescribed period and a blue varying operation of adding or subtracting a prescribed variation amount to or from a tone value of the primary color B in a prescribed period, and the comparison result entering means is provided with a function of inputting, from an operator, a green approximation signal, indicating that the color of the reference body and the color of the test pattern have become closest to each other, in a state in which the tone value varying means is performing the green varying operation, and a blue approximation signal, indicating that the color of the reference body and the color of the test pattern have become closest to each other, in a state in which the tone value varying means is performing the blue varying operation, and deeming that a comparison result, indicating that the objects of comparison are matched, has been input when both the green approximation signal and the blue approximation signal are input.

(6) The sixth feature of the present invention resides in a white chromaticity measuring device for a color monitor according to the fifth feature, wherein in performing the varying operation, a variation range of a tone value is set, and the tone value is varied cyclically within the variation range in a manner such that when the tone value obtained by the varying operation of adding the variation amount exceeds a maximum tone value of the variation range, a cyclic operation of incrementing from a minimum tone value side of the variation range is performed, and when the tone value obtained by the varying operation of subtracting the variation amount falls below the minimum tone value of the variation range, a cyclic operation of decrementing from the maximum tone value side of the variation range is performed.

(7) The seventh feature of the present invention resides in a white chromaticity measuring device for a color monitor according to the fifth feature, wherein in performing the varying operation, a variation range of a tone value is set, and the tone value is varied reciprocatingly within the variation range in a manner such that when the tone value obtained by the varying operation of adding the variation amount exceeds a maximum tone value of the variation range, a fold-back operation of switching to the varying operation of subtracting the variation amount from the maximum tone value side is performed, and when the tone value obtained by the varying operation of subtracting the variation amount falls below a minimum tone value of the variation range, a fold-back operation of switching to the varying operation of adding the variation amount from the minimum tone value side is performed.

(8) The eighth feature of the present invention resides in a white chromaticity measuring device for a color monitor according to the six or seventh feature, wherein the tone value varying means is provided with a function of starting the blue varying operation when the green approximation signal is input in a state in which the green varying operation is being performed, starting the green varying operation when the blue approximation signal is input in a state in which the blue varying operation is being performed, and repeatedly executing the green varying operation and the blue varying operation alternatingly and a function of repeatedly executing the operations while gradually reducing the tone value variation amount and the variation range, and the comparison result entering means is provided with a function of deeming that a comparison result indicating that the objects of comparison are matched is input when inputs of both the green approximation signal and the blue approximation signal are completed after the variation amount has reached a predefined value.

(9) The ninth feature of the present invention resides in a white chromaticity measuring device for a color monitor according to the first feature, wherein the tone value varying means is provided with a function of selectively performing a red/green varying operation, in which a prescribed variation amount is added or subtracted to or from a tone value of the primary color R in a prescribed period or a prescribed variation amount is added or subtracted to or from a tone value of the primary color G in a prescribed period, and a yellow/blue varying operation, in which a prescribed variation amount of the same value is added or subtracted to or from a tone value of the primary color R and a tone value of the primary color G simultaneously in a prescribed period or a prescribed variation amount is added or subtracted to or from a tone value of the primary color B in a prescribed period, and the comparison result entering means is provided with a function of inputting, from an operator, a red/green approximation signal, indicating that the color of the reference body and the color of the test pattern have become closest to each other, in a state in which the tone value varying means is performing the red/green varying operation, and a yellow/blue approximation signal, indicating that the color of the reference body and the color of the test pattern have become closest to each other, in a state in which the tone value varying means is performing the yellow/blue varying operation, and deeming that a comparison result, indicating that the objects of comparison are matched, has been input when both the red/green approximation signal and the yellow/blue approximation signal are input.

(10) The tenth feature of the present invention resides in a white chromaticity measuring device for a color monitor according to the ninth feature, wherein in performing the red/green varying operation, a first operation of varying the tone value of the primary color R and a second operation of varying the tone value of the primary color G are alternatingly executed repeatedly, and in performing the yellow/blue varying operation, a third operation of varying the tone values of the primary color R and the primary color G and a fourth operation of varying the tone value of the primary color B are alternatingly executed repeatedly.

(11) The eleventh feature of the present invention resides in a white chromaticity measuring device for a color monitor according to the ninth or tenth feature, wherein in performing the varying operation, a variation range of a tone value is set, and the tone value is varied cyclically within the variation range in a manner such that when the tone value obtained by the varying operation of adding the variation amount exceeds a maximum tone value of the variation range (in the case where the primary color R and the primary color G are varied simultaneously, when a tone value of at least one of the primary color R and the primary color G exceeds the maximum tone value), a cyclic operation of incrementing from a minimum tone value side of the variation range is performed (in the case where the primary color R and the primary color G are varied simultaneously, a process of cycling a smaller of the tone value of the primary color R and the tone value of the primary color G to the minimum tone value side and a process of keeping a difference between the two tone values fixed are performed), and when a tone value obtained by the varying operation of subtracting the variation amount falls below the minimum tone value of the variation range (in the case where the primary color R and the primary color G are varied simultaneously, when a tone value of at least one of the primary color R and the primary color G falls below the minimum tone value), a cyclic operation of decrementing from the maximum tone value side of the variation range is performed (in the case where the primary color R and the primary color G are varied simultaneously, a process of cycling a larger of the tone value of the primary color R and the tone value of the primary color G to the maximum tone value side and a process of keeping a difference between the two tone values fixed are performed).

(12) The twelfth feature of the present invention resides in a white chromaticity measuring device for a color monitor according to the ninth or tenth feature, wherein in performing the varying operation, a variation range of a tone value is set, and the tone value is varied reciprocatingly within the variation range in a manner such that when the tone value obtained by the varying operation of adding the variation amount exceeds a maximum tone value of the variation range (in the case where the primary color R and the primary color G are varied simultaneously, when a tone value of at least one of the primary color R and the primary color G exceeds the maximum tone value), a fold-back operation of switching to the varying operation of subtracting the variation amount from the maximum tone value side is performed, and when a tone value obtained by the varying operation of subtracting the variation amount falls below a minimum tone value of the variation range (in the case where the primary color R and the primary color G are varied simultaneously, when a tone value of at least one of the primary color R and the primary color G falls below the minimum tone value), a fold-back operation of switching to the varying operation of adding the variation amount from the minimum tone value side is performed.

(13) The thirteenth feature of the present invention resides in a white chromaticity measuring device for a color monitor according to the tenth to twelfth features, wherein the tone value varying means is provided with a function of starting the yellow/blue varying operation when the red/green approximation signal is input in a state in which the red/green varying operation is being performed, starting the red/green varying operation when the yellow/blue approximation signal is input in a state in which the yellow/blue varying operation is being performed, and repeatedly executing the red/green varying operation and the yellow/blue varying operation alternatingly and a function of repeatedly executing the operations while gradually reducing the tone value variation amount and the variation range, and the comparison result entering means is provided with a function of deeming that a comparison result indicating that the objects of comparison are matched is input when inputs of both the red/green approximation signal and the yellow/blue approximation signal are completed after the variation amount has reached a predefined value.

(14) The fourteenth feature of the present invention resides in a program for making a computer function as the white chromaticity measuring device for a color monitor according to the first to thirteenth features, or a computer-readable recording medium, recording the program.

BEST MODE FOR CARRYING OUT THE INVENTION

Figure 1:
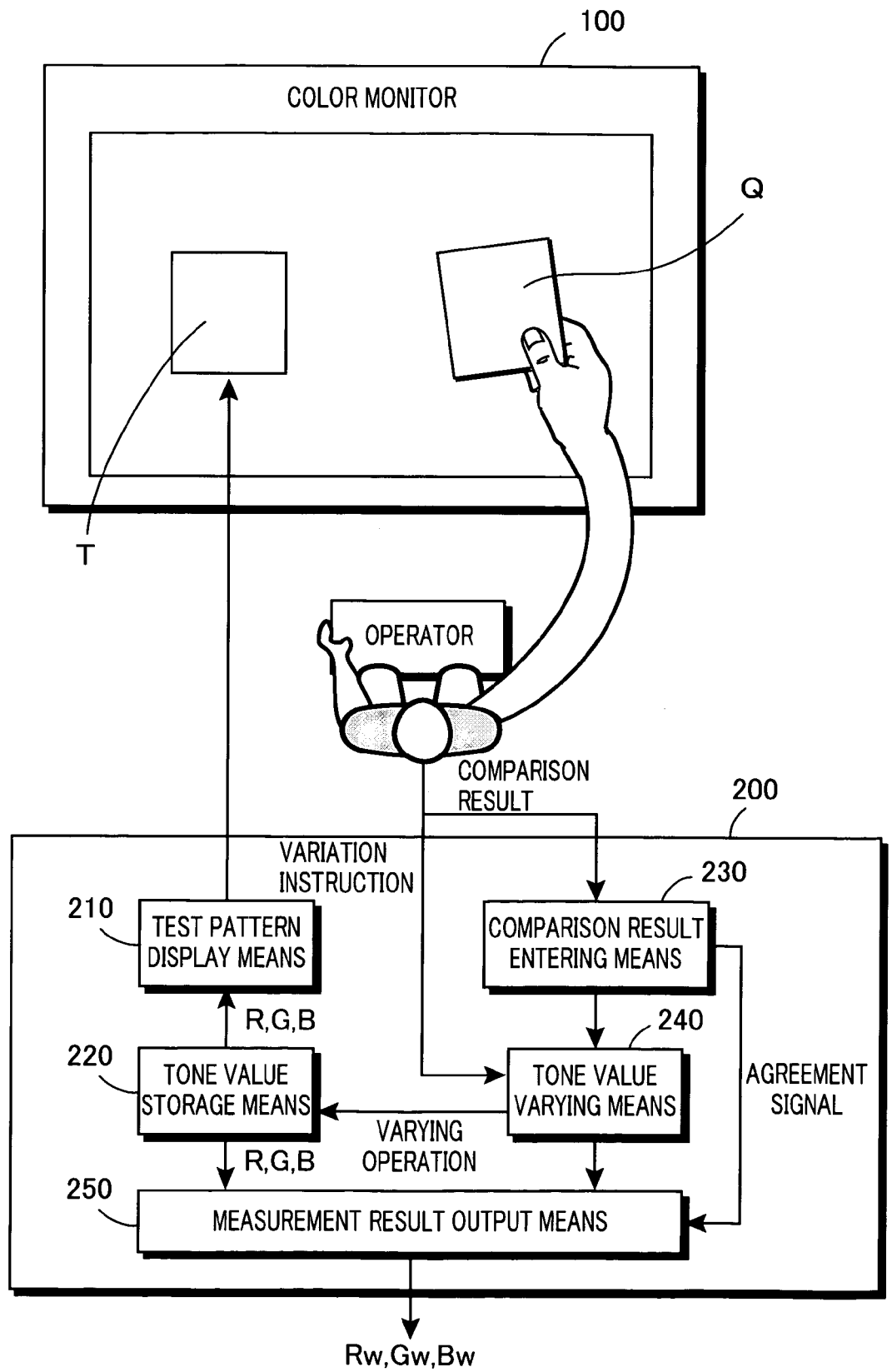
FIG. 1 is a block diagram showing the arrangement of a color monitor white chromaticity measuring device of a basic embodiment of this invention.

This invention will now be described based on the illustrated embodiments. FIG. 1 is a block diagram showing a basic embodiment of this invention. Here, color monitor 100 is a monitor having a function of displaying color images using the three primary colors R, G, and B and may be a CRT type monitor or a liquid crystal type monitor. Meanwhile, white chromaticity measuring device 200 is this invention's measuring device and has a function of measuring the white chromaticity of color monitor 100 with the illumination environment of the installation location taken into consideration.

The basic principle of this invention is to prepare in advance a reference body Q, which indicates a white color that is to serve as a reference, and make adjustments so that the color of a test pattern T that is displayed on the screen of color monitor 100 appears to be of the same color as the color of reference body Q. That is, in FIG. 1, whereas test pattern T, drawn in the screen of color monitor 100, is a pattern that is displayed on the screen of color monitor 100 based on signals provided from the measuring device 200, reference body Q is an actual object held by an operator's hand. The operator performs the tasks of positioning reference body Q near test pattern T, comparing the colors of the two with the naked eyes, and inputting the comparison results in measuring device 200.

Reference body Q may be any object as long as it is an object that indicates a white color that is to serve as the reference. For example, a general, card-like, white paper may be used as reference body Q. However, when making measurements, since it is preferable for the same reference body Q to be used constantly for a plurality of monitors, an object with some degree of robustness is used as reference body Q for practical purposes. For example, a white tile, etc., may be used as a reference body Q that has sufficient robustness for practical purposes. Also, since reference body Q is used as an indicator that indicates a unified reference for "white," it is preferably an object that is as physically white as possible. From these standpoints, a perfect diffuser using barium sulfate is suitable for use as reference body Q. Needless to say, a reference monitor that is to serve as a reference may be prepared separately and a white display on the screen of this reference monitor may be used as reference body Q. However, the white display of a reference monitor may vary with secular change and is inconvenient to handle in consideration of the size and weight of the device itself, and is thus not so preferable for practical use. In cases where a DTP task for preparing printed matter is to be performed on a monitor, since it is preferable for the white on the printed matter to be matched with the white on the monitor, the paper used for the actual printing process is used as it is as reference body Q. In this case, even if the color of the paper is deviated from a perfect white, the white on the printed matter (the color of the portions on which ink is not deposited) can be matched with the white on the monitor.

As illustrated, this invention's white chromaticity measuring device 200 comprises a test pattern display means 210, a tone value storage means 220, a comparison result entering means 230, a tone value varying means 240, and a measurement result output means 250. In actuality, white chromaticity measuring device 200 is a device that is realized by a computer, such as a personal computer, that is connected to color monitor 100 and the respective components mentioned above are all components that are realized by a program installed in this computer. This program may be stored and distributed in a computer-readable recording medium.

Test pattern display means 210 is a component having a function of making test pattern T be displayed on the screen of color monitor 100 to be measured. Though in the illustrated example, test pattern T of a square region is displayed, the size and shape of test pattern T that is displayed are not restricted in particular. However, as will be described later, for the operator to perform visual comparison tasks, it is preferable to display test pattern T of the substantially the same shape and size as reference body Q that is used. This is because, due to the characteristics of the human eye, even for the same color, the color that is recognized sensually varies with the size of the area that is presented.

Meanwhile, in tone value storage means 220 is stored a combination of tone values of the three primary colors R, G, and B. For example, if the tone value of each of the three primary colors R, G, and B is expressed as 8-bit data in the range of 0 to 255, tone values, such as R=255, G=200, and B=234, are stored in tone value storage means 220. Test pattern display means 210 performs display of test pattern T based on this combination of the tone values of the three primary colors R, G, and B that is stored in tone value storage means 220. That is, test pattern T is a pattern having a uniform color across its entire area and the color thereof is determined based on the tone values of the three primary colors R, G, and B that are stored in tone value storage means 220. When as in the abovementioned example, the tone values, R=255, G=200, and B=234, are stored in tone value storage means 220, the entire area of test pattern T is displayed in the color corresponding to these tone values. Needless to say, even if the same tone values, R=255, G=200, B=234, are provided, the actual physical color that is displayed as test pattern T differs according to each individual monitor.

Tone value varying means 240 has a function of performing a varying operation of varying, with time and in accordance with prescribed rules that are determined in advance, the tone values that are stored in tone value storage means 220. Though the specific details of this varying operation will be described later, by this varying operation, the tone values inside tone value storage means 220 change with time and thus obviously the color of test pattern T, displayed on the screen of color monitor 100, also changes with time. The operator performs the task of comparing the color of test pattern T that varies with time and the color of reference body Q.

Comparison result entering means 230 serves a function of inputting the comparison result of comparing the color of reference body Q and the color of test pattern T from the operator viewing test pattern T, displayed on the screen of color monitor 100, in the state wherein the varying operation by tone value varying means 240 is being performed. When a comparison result indicating the matching of the two colors that are the objects of comparison is input from the operator, an agreement signal is provided to measurement result output means 250.

Measurement result output means 250 outputs the combination of the tone values of the three primary colors R, G, and B (for example, Rw, Gw, and Bw), which are stored in tone value storage means 220 at the point in time at which the agreement signal from comparison result entering means 230 is provided (that is, at the point in time at which the operator inputs the comparison result indicating the matching of the two colors that are the objects of comparison), as the measurement result representing the white chromaticity based on reference body Q under the present illumination environment of color monitor 100.

Tone values Rw, Gw, and Bw, which are output from measurement result output means 250 signify that when these tone values are provided to color monitor 100, which is the object of measurement, a color, which is observed to be of the same color as reference body Q under the present illumination environment, is displayed. For example, when the results, Rw=255, Gw=205, and Bw=180, are output, the combination of tone values, R=255, G=205, and B=180, are to be provided in order to make white, equivalent to that of reference body Q, be displayed on the display screen of color monitor 100 under the present illumination environment. Though obviously, the specific values of tone values Rw, Gw, and Bw that are obtained as the measurement results differ according to each color monitor installed under each individual illumination environment, at least for each individual color monitor, when tone values Rw, Gw, and Bw, which are obtained as the measurement results for each individual case, are provided, white, which is equivalent to that of reference body Q as observed under that illumination environment, will be obtained.

The measurement results of this invention's white chromaticity measurement device are thus useful in cases where DTP processes for preparing commercial printed matter are carried out by a division of labor among a plurality of staff members. Though each individual staff member will use a color monitor having unique characteristics under a unique illumination environment, by each of the staff members using a reference body Q in common, by performing measurement with this invention's white chromaticity measuring device 200, and by performing correction with installing the white chromaticity profile data that are obtained into each staff member's own personal computer, all staff members will become able to view color images, on their respective monitors, based on the same white color in terms of the visual sensation without being affected by such conditions as whether the indoor illumination is a fluorescent lamp or a light bulb, the color of the wallpaper in the room, whether or not sunlight shines in, etc.

Though obviously such unification cannot be obtained with profile data that are obtained using reference bodies Q having different white characteristics to make measurements, by arranging the use, for example, of a perfect diffuser, formed of barium sulfate, as the standard reference body Q, profile data of considerably broadly unified properties can be obtained even if objects that are not necessarily the same physically are used as reference bodies.

Specific varying operations by tone value varying means 240 and specific methods of inputting comparison results into comparison result entering means 230 will now be described. As mentioned above, tone value varying means 240 is a component that performs a varying operation of varying, with time and in accordance with priorly determined prescribed rules, the tone values that are stored in tone value storage means 220, and in terms of practical use, the comparison task performed by the operator will be facilitated if, instead of varying the tone values of a plurality of primary colors simultaneously, one of the three primary colors R, G, and B is selected as a specific color and the tone value of the single specific color is varied at one time. The operator will then be able to determine an optimal tone value separately and independently for each of the three primary colors R, G, and B in order to achieve matching with the color of reference body Q.

Figure 2:
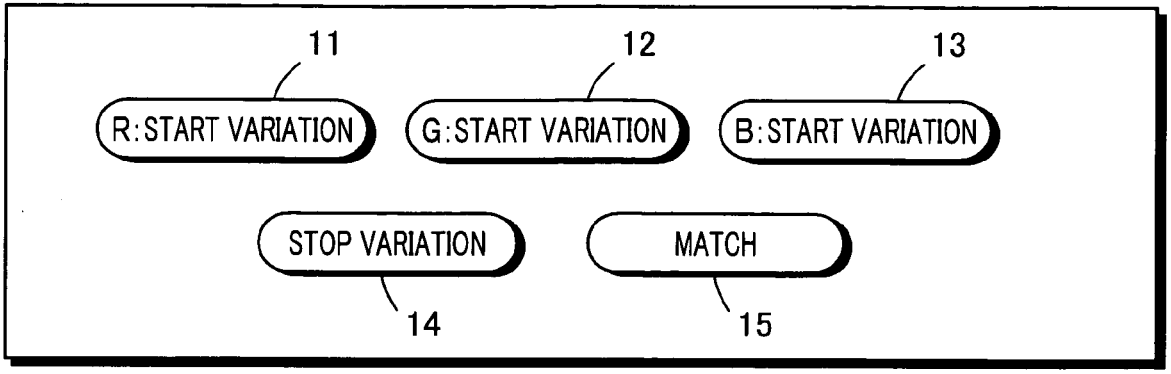
FIG. 2 is a plan view showing an example of an operation panel used for performing measurement tasks with the white chromaticity measuring device shown in FIG. 1.

FIG. 2 is a plan view showing an example of an operation panel to be used to perform this task. Here, buttons 11 to 13 are variation starting buttons for the three primary colors R, G, and B respectively, button 14 is a variation stopping button in common for the three primary colors, and button 15 is a match button. Here, variation starting buttons 11 to 13 and variation stopping button 14 are used by the operator to provide variation instructions to tone value varying means 240, and match button 15 is used by the operator to input the comparison result that indicates matching into comparison result entering means 230. These buttons are displayed along with test pattern T on the display screen of color monitor 100 and can be pressed by clicking with a mouse pointer, etc.

When the operator clicks variation starting button 11, tone value varying means 240 starts, in accordance with this varying instruction from the operator, a varying operation of varying tone value R, stored inside tone value storage means 220. Specifically, a varying operation of adding or subtracting a prescribed variation amount to or from tone value R at a prescribed period is started. For example, if the initial value of tone value R stored in tone value storage means 220 is set to R=100, the prescribed period is 1 second, and the variation amount is 5, by the clicking of variation starting button 11, the tone value varies in the manner of R=105, 110, 115 . . . every 1 second. Obviously the color of test pattern T on color monitor 100 will vary gradually as well. Variation stopping button 14 is a button for stopping such a varying operation and can provide an instruction for stopping the varying operation to tone value varying means 240.

Likewise, variation starting button 12 provides an instruction of starting a varying operation of varying tone value G to tone value varying means 240, and variation starting button 13 provides an instruction of starting a varying operation of varying tone value B to tone value varying means 240.

Figure 3:
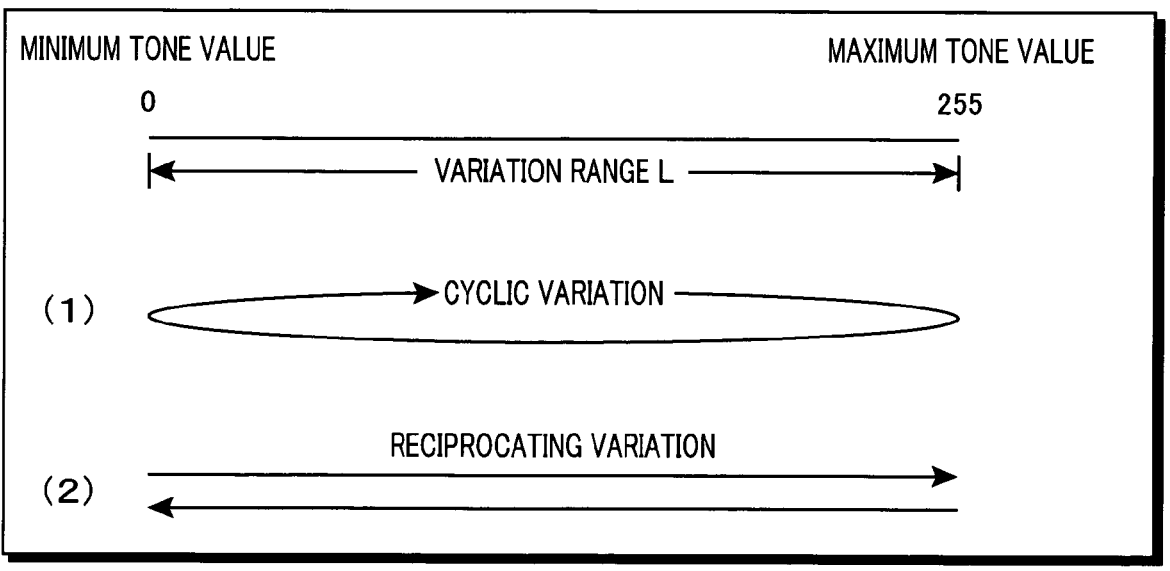
FIG. 3 is a diagram illustrating a cyclic varying operation and a reciprocating varying operation for varying the tone values of a specific color.

In such a tone value varying operation, a tone value is varied cyclically or varied reciprocatingly within the tone value range of 0 to 255 and this variation is arranged to be continued perpetually until variation stopping button 14 is clicked. FIG. 3 is a diagram for describing such a cyclic variation and a reciprocating variation. In the illustrated example, the range from a minimum tone value of 0 to a maximum tone value of 255 is set as a variation range L.

As shown in (1) of FIG. 3, in a varying operation based on cyclic variation, a cyclic process, wherein when the tone value that is obtained by a varying operation of adding a variation amount exceeds the maximum tone value of 255 of the variation range L, the incrementing is started from the side of the minimum tone value of 0 of the variation range L, is performed, or a cyclic process, wherein when the tone value that is obtained by a varying operation of oppositely subtracting a variation amount falls below the minimum tone value of 0 of the variation range L, the decrementing is started from the side of the maximum tone value of 255, is performed. For example, when by the varying operation of adding the variation amount S=5, the tone value increases in the manner of: . . . 245, 250 and reaches 255, though 260 will be obtained if 5 is added subsequently, in the present case, 256 is subtracted to set the next tone value to 4 and thereby cyclically vary the tone value in the manner of: 9, 14, 19, . . . . In the case where the variation amount S=5 is to be subtracted, the tone value is varied cyclically in the manner of: . . . 19, 14, 9, 4, 255, 250 . . . .

Meanwhile, as shown in (2) of FIG. 3, in a varying operation based on reciprocating variation, a fold-back process, wherein when the tone value that is obtained by the varying operation of adding the variation amount exceeds the maximum tone value of 255 of the variation range L, switching to the varying operation of subtracting the variation amount from this side of the maximum tone value of 255, is performed or a fold-back process, wherein when the tone value that is obtained by the varying operation of oppositely subtracting the variation amount falls below the minimum tone value of 0 of the variation range L, switching to the varying operation of adding the variation amount from this side of the minimum tone value of 0, is performed. For example, when by the varying operation of adding the variation amount S=5, the tone value increases in the manner of: . . . 245, 250 and reaches 255, though 260 will be obtained if 5 is added subsequently, in the present case, a fold-back process of switching to subtracting the variation amount of 5 is performed at the point at which 255 is reached so that the tone values will subsequently vary in the manner of: 250, 245, 240 . . . . And when the tone value reaches 15, 10, 5, and 0, a fold-back process of switching to adding the variation amount of 5 again is performed so that the tone values will subsequently vary in the manner of: 5, 10, 15 . . . .

When any of variation starting buttons 11, 12, and 13, shown in FIG. 2, is clicked, since the tone value of the corresponding primary color will undergo cyclic variation or reciprocating variation in the variation range of 0 to 255, the operator will become able to grasp the rhythm by which test pattern T varies repeatedly within the fixed period. Once this rhythm is grasped, it should become possible to comparatively readily perform the operation of clicking varying stopping button 14 at the point at which the color of test pattern T becomes closest to the color of reference object Q.

In the present embodiment, since a tone value varying operation is always performed as an operation of varying just the tone value of a single specific color among the three primary colors R, G, and B, it is preferable to provide an arrangement wherein, after any of variation starting buttons 11, 12, and 13 is clicked and the operation of varying the tone value of a specific color is performed, the variation starting button of another color will not function until after variation stopping button 14 is clicked to stop the varying operation concerning the specific color, or an arrangement, wherein when while the varying operation concerning a first specific color is being performed, the variation starting button for a second specific color is clicked, the varying operation concerning the second specific color is started upon automatically stopping the varying operation concerning the first specific color.

By thus providing tone value varying means 240 with a function of starting and stopping, in accordance with the variation instruction provided from the operator, the varying operation of adding or subtracting the prescribed variation amount to or from the tone value of each prescribed primary color in the prescribed period, the operator can provide the instruction of starting or stopping as necessary the varying operation on a desired primary color among the three primary colors R, G, and B and thereby perform the task of making the color of test pattern T approach the color of reference body Q. When in the final stage, a state where it can be recognized that the objects of comparison are matched, match button 15 is clicked.

In the present Application, "colors are matched" or "colors are the same" does not necessarily refer just to a state wherein the recognition that two colors are matched completely is obtained but also refers to a state wherein, upon variation of one of the colors, the recognition that the two colors have become closest to each other is obtained. The operator thus visually compares test pattern T, which varies in color, and reference object Q and performs the operation of clicking match button 15 at the instant at which he/she feels that the colors of the two become closest to each other. When this match button 15 is clicked, the comparison result indicating the matching of the comparison objects is input into comparison result entering means 230, and an agreement signal is provided from comparison result entering means 230 to measurement result output means 250. The process of outputting tone values Rw, Gw, and Bw of the three primary colors R, G, and B that are stored in tone value storage means 220 at this point is performed by measurement result output means 250 as mentioned above.

However in terms of practical use, an embodiment, wherein an operation panel, such as shown in FIG. 2, is used to vary the tone value of each of the three primary colors R, G, and B is not necessarily of good operability for an operator. This is because there are the three parameters of the primary colors R, G, and B which are subject to variation. Actually, a task of adjusting these three parameters to match the color of test pattern T to the color of reference body Q requires considerable expertise. Though an operator in general may be able to recognize that the two are not matched, it is difficult to grasp for which of the primary colors the tone value should be changed and how the tone value should be changed to make them matched.

Thus for practical use, it is preferable to fix the tone value of one of the primary colors at the maximum tone value and perform varying operations that vary just the tone values of the remaining two primary colors. Since white, to begin with, is a color that is theoretically obtained by maximizing the luminance of each of the primary colors, it is preferable to set the tone value of at least one of primary colors among the three primary colors R, G, and B to the maximum tone value. There will thus be no problem even if the tone value of one of the primary colors is fixed at the maximum tone value.

Upon examining the white characteristics of several types of color monitors that are made commercially available by several manufacturers under various illumination environments, the present inventor found a trend in common. That is, in all cases, when the tone value of each of the three primary colors R, G, and B is set to the maximum tone value (that is, when the tone values are set to R=255, G=255, and B=255), the color that is displayed on the screen tends to be slightly greenish or slightly bluish with respect to true white but is never observed to be reddish with respect to true white. In other words, in all cases, in order to display white, either the tone value of the primary color G or the tone value of the primary color B should be decreased slightly from the state of R=255, G=255, and B=255.

Figure 4:
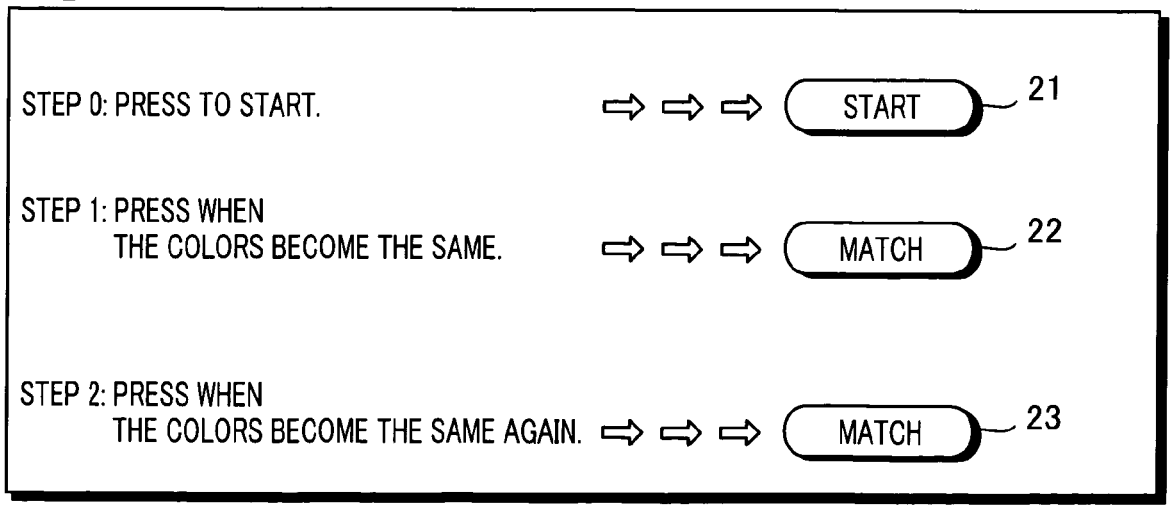
FIG. 4 is a plan view showing another example of an operation panel used for performing measurement tasks with the white chromaticity measuring device shown in FIG. 1.

Based on this fact, it is rational in terms of practical use to fix the tone value of the primary color R among the three primary colors R, G, and B to the maximum tone value so that R=255 and to perform the tone value varying operations just on the primary color G and the primary color B. FIG. 4 is a plan view showing an example of an operation panel that is based on such a standpoint. This operation panel is provided only with a start button 21 and two match buttons 22 and 23 and the operator does not need to keep the concept of the three primary colors R, G, and B in mind. Next to each button is provided a corresponding explanatory text and the operator needs only to click the buttons in accordance with these explanatory texts.

First, the operator clicks start button 21 in accordance with the explanatory text of: "Step 0: Press to start." The varying operation concerning the primary color G is then started. During this operation, the tone values of the primary colors R and B are kept fixed. During this varying operation, the operator views test pattern T, and at the point of recognizing that it has become the same in color as reference body Q, clicks match button 22 in accordance with the explanatory text of: "Step 1: Press when the colors become the same." The varying operation concerning the primary color B is then started. During this operation, the tone values of the primary colors R and G are kept fixed. That is, at the point at which match button 22 is clicked, the varying operation concerning the primary color G stops and the tone value at the point of stoppage is maintained as it is. During the varying operation concerning the primary color B, the operator views test pattern T and at the point of recognizing that it has become the same in color as reference body Q, clicks match button 23 in accordance with the explanatory text of: "Step 2: Press when the colors become the same again."

By these operations, the optimal tone value Gw for the primary color G and the optimal tone value Bw for the primary color B in terms of matching the color of test pattern T and the color of reference body Q are determined by the button operations of the operator. During this process, the primary color R is fixed at the maximum tone value R=255 and the optimal tone value for the primary color R will always be Rw=255.

Thus in this example using the operation panel shown in FIG. 4, tone value varying means 240 performs the varying operation of adding or subtracting the prescribed variation amount to or from the tone value of a specific primary color to be varied in the prescribed period and performs the process of switching the specific primary color to be varied in accordance with the comparison result input into comparison result entering means 230. That is, though match button 22 is for inputting the comparison result indicating that the color of test pattern T and the color of reference body Q are matched (or have become close), it also functions to provide the instruction of switching from the varying operation concerning the primary color G to the varying operation concerning the primary color B.

Thus in order to enable measurements using the operation panel shown in FIG. 4, tone value varying means 240 is provided with a function of selectively performing the green varying operation of adding or subtracting the prescribed variation amount to or from the tone value of the primary color G in the prescribed period and the blue varying operation of adding or subtracting the prescribed variation amount to or from the tone value of the primary color B in the prescribed period, and comparison result entering means 230 is provided with a function of inputting, from the operator, a green approximation signal, indicating that the color of reference body Q and the color of test pattern T have become closest to each other, in the state in which tone value varying means 240 is performing the green varying operation, and a blue approximation signal, indicating that the color of reference body Q and the color of test pattern T have become closest to each other, in the state in which tone value varying means 240 is performing the blue varying operation. And when both the blue approximation signal and the green approximation signal have been input in comparison result entering means 230, it is deemed that a comparison result indicating that the objects of comparison are matched has been input and the agreement signal is provided to measurement result output means 250.

Figure 5:
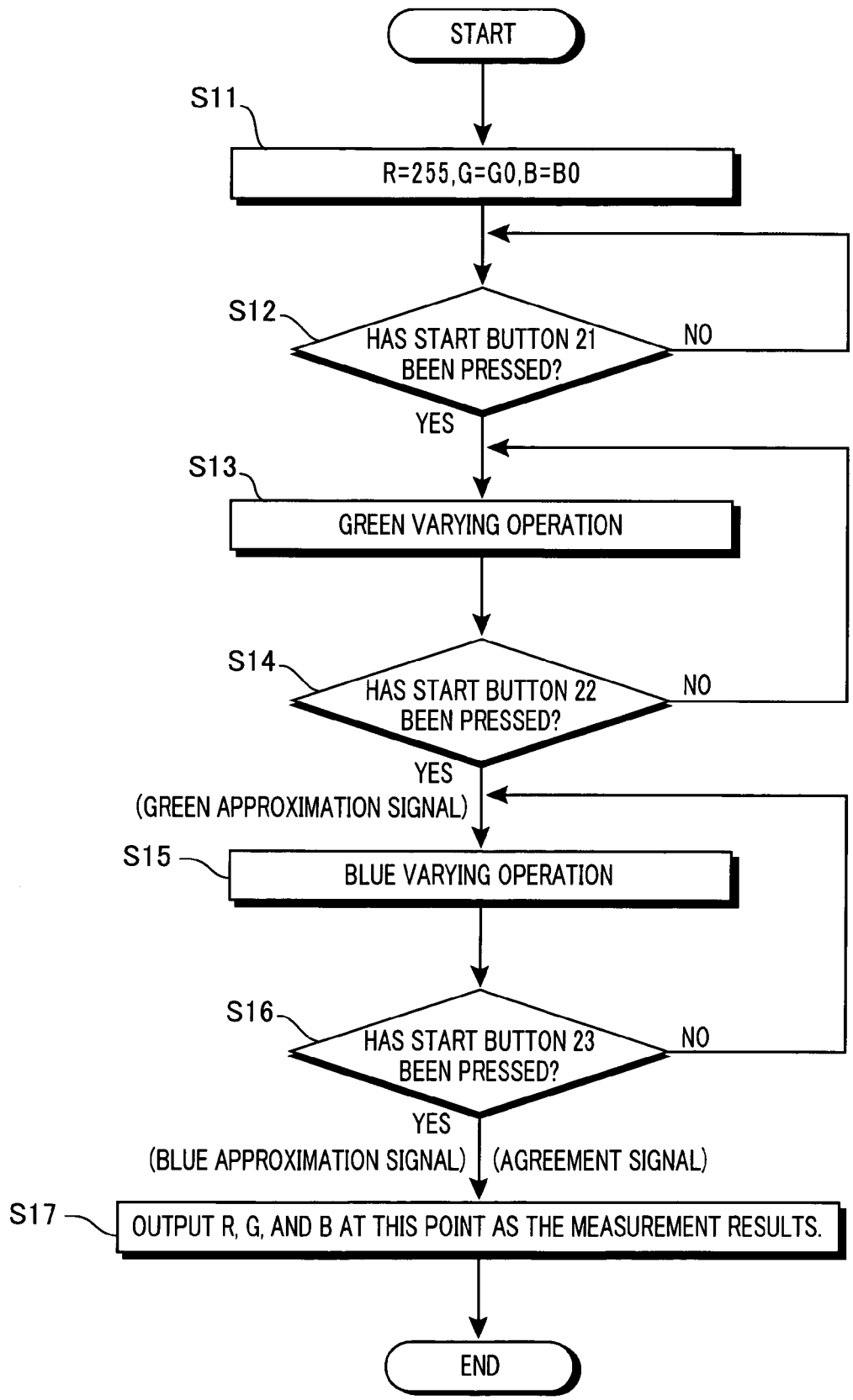
FIG. 5 is a flowchart illustrating measurement procedures using the operation panel shown in FIG. 4.

FIG. 5 is a flowchart showing the measurement procedures using the operation panel shown in FIG. 4. First, in step S11, the tone values of the respective primary colors are set to the initial values. In this example, though the initial value for the primary color R is set to 255, the initial value G0 for the primary color G and the initial value B0 for the primary color B may be arbitrary values. Next in step S12, whether or not start button 21 has been pressed is detected. When start button 21 is pressed, the green varying operation is executed in step S13. That is, the tone value of the primary color G is increased or decreased by just the prescribed variation amount. Here, a cyclic process or a fold-back process is performed as necessary. Then in step S14, whether or not match button 22 has been pressed is judged, and until match button 22 is pressed, the green varying operation of step S13 is executed repeatedly. Settings are made so that this loop process of steps S13 and S14 is executed in the prescribed period, such as a 1-second period.

When match button 22 is pressed eventually, the blue varying operation is executed in step S15. That is, at the point at which match button 22 is pressed, the green approximation signal is provided to comparison result entering means 230, the green varying operation that had been executed up until then is stopped, and the tone value of the primary color G is fixed at the value at that point. The varying operation of the tone value of the primary color B, which had been fixed up until now, is then started. That is, the tone value of the primary color B is increased or decreased by just the prescribed variation amount. Here, a cyclic process or a fold-back process is performed as necessary. Then in step S16, whether or not match button 23 has been pressed is judged, and until match button 23 is pressed, the blue varying operation of step S15 is executed repeatedly. Settings are made so that this loop process of steps S15 and S16 is also executed in the prescribed period, such as the 1-second period.

When match button 23 is pressed, step S17 is executed. That is, at the point at which match button 23 is pressed, the blue approximation signal is provided to comparison result entering means 230, the blue varying operation that had been executed up until then is stopped, and the tone value of the primary color B is fixed at the value at that point. The agreement signal is then provided from comparison result entering means 230 to measurement result output means 250. Upon receiving this agreement signal, measurement result output means 250 performs the process of outputting the respective tone values of the primary colors R, G, and B that are stored in tone value storage means 220 at that point as the measurement results.

In the measurement procedures illustrated in the flowchart of FIG. 5, the operator determines the tone value of the primary color G by the clicking of match button 22 in step S14 and determines the tone value of the primary color B by the clicking of match button 23 in step S16, and the tone values Gw and Bw that are determined in these steps and the tone value Rw (=255) that was fixed from the start are output as the measurement results. Even with this method, since the tone value undergoes cyclic variation or reciprocating variation during the varying operation of each color, the operator can perform the clicking of the match button at the point at which the colors become closest to each other and can thus determine the optimal tone values with some degree of accuracy.

Figure 6:
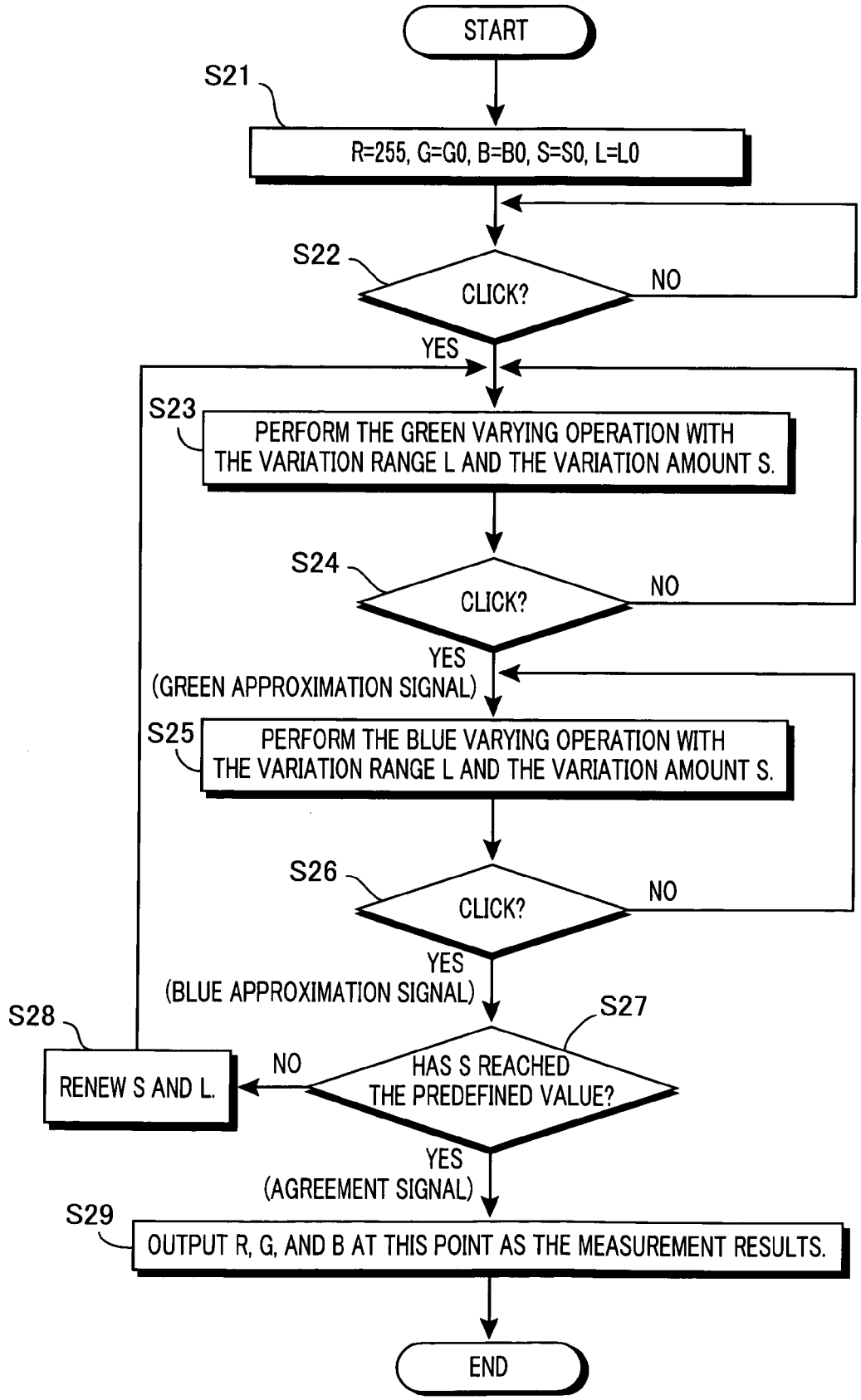
FIG. 6 is a flowchart illustrating the most practical measurement procedures using this invention's white chromaticity measuring device.

However, for more practical operation, instead of determining the tone values of the primary colors G and B in a single click operation, respectively, it is more preferable to provide the operator with several opportunities in making the final determination. The measurement procedures shown in the flowchart of FIG. 6 illustrate an embodiment that takes this point into consideration. With this embodiment, though the tone value of the primary color R is still fixed at the maximum tone value of 255, the tone values of the primary colors G and B are determined by a plurality of click operations by the operator.

First, in step S21, the tone values of the respective primary colors are set to the initial values. Here again, the initial value for the primary color R is set to 255 while the initial value G0 for the primary color G and the initial value B0 for the primary color B may be arbitrary values. Here, for the convenience of description, it will be supposed that the initial values are set so that G0=200 and B0=200. In this step S21, the initial value S0 of the variation amount S of the varying operation and the initial value L0 of the varying range L are also set. Here, it will be supposed that these are set so that S0=10 and L0=0 to 255.

Next in step S22, whether or not a mouse click has been performed is detected. In the present embodiment, a plurality of buttons are not displayed as was done in the embodiments described above, and just a single button is displayed on the screen. This single button serves as a step transition button for moving into the next step of the measurement procedures. The operator thus needs only to perform the operation of clicking this single button with the mouse, etc., and a task of selecting a button is not required. Also, instead of displaying any specific buttons, arrangements may be made so that the performing of a click operation will be recognized no matter where on the screen a mouse click is performed. Needless to say, the operator's operation is not limited to a mouse click and an operation, for example, of pressing the space key on a keyboard may be used in place of the mouse click operation.

When in step S22, a click is detected, the green varying operation is executed in step S23. That is, the tone value of the primary color G is increased or decreased by just the value of the variation amount S at that point. Here, a cyclic process or a fold-back process is performed as necessary, and the variation range L that is to serve as the basis of the cyclic process or fold-back process is the range that is set at that point. Here, for the convenience of description, an example will be described wherein a varying operation of increasing by just the variation amount S is always performed and a cyclic process is always performed when the variation range L is exceeded. With the present example, since the variation amount S is set to the initial value S0=10 and the variation range L is set to the initial range L0=0 to 255, first, the tone value of the primary color G is renewed from the initial value of 200 to 210 in step S23 and, until the maximum tone value of 255 is exceeded, the renewal process of increasing by 10 at a time is continued.

Until a click is detected in step S24, the process of looping steps S23 and S24 is executed repeatedly, and the renewal process of increasing the tone value of the primary color G by the variation amount S=10 at a time in the manner of: 220, 230, 240, 250 . . . is performed. When the tone value is renewed to 260 in a subsequent stage, since this exceeds the maximum tone value 255 of the variation range L, 256 is subtracted and the new tone value is set to 4 to perform the cyclic process. Thereafter, the renewal process of increasing the tone value of the primary color G by the variation amount S=10 at a time in the manner of: 14, 24, 34, . . . is performed. During these processes, the values for the primary colors R and B are fixed at R=255 and B=200, respectively.

When such a renewal process is executed, for example, at a 1-second period, the tone value of the primary color G will undergo a full cycle in approximately 25 seconds, and the operator can thus observe the variation of the color of test pattern T in a period of approximately 25 seconds. A click operation is then performed at the point at which the color of test pattern T is felt to be closest to the color of reference body Q. Here, in continuing with the description, it will be deemed, as an example, that the clicking operation by the operator is performed when the primary color G=193.

When a click is detected in step S24, the blue varying operation is executed in step S25. This click operation at step S24 has the significance of inputting the green approximation signal into comparison result entering means 230 and providing to tone value varying means 240 the instruction of switching the primary color that is subject to variation. The green varying operation that had been executed up until then is thus stopped, and the tone value of the primary color G is maintained at the state of G=193. The varying operation of increasing the tone value of the primary color B by just the value of the variation amount S=10 is then performed. During this process, the other colors are kept fixed at R=255 and G=193.

Until the next click is detected in step S26, the process of looping steps S25 and S26 is executed repeatedly, and the renewal process, wherein the tone value of the primary color B is increased by cyclic variation by the variation amount S=10 at a time in the manner of: 210, 220, 230, 240, 250, 4, 14, 24 . . . . And when the operator feels the color of test pattern T to have become closest to the color of reference body Q, again, the operator performs the click operation. Here, in continuing with the description, it will be deemed, as an example, that the clicking operation by the operator is performed when the primary color B=231. At this point, the tone values of the respective primary colors stored in tone value storage means 220 are: R=255, G=193, and B=231.

When a click is detected in step S26, step S27 is entered. This click operation at step S26 has the significance of inputting the blue approximation signal into comparison result entering means 230 and providing to tone value varying means 240 the instruction of switching the primary color that is subject to variation. Thus via steps S27 and S28, the processes from step S23 are executed again so that the varying operation of the primary color B is stopped and the varying operation of the primary color G is restarted. However, in the procedures of this second round, the variation amount S and the variation range L are renewed. Specifically in step S28, a renewal process of reducing both the variation amount S and the variation range L is executed. Here it will be deemed that for the second round, the renewal of setting the variation amount to S=3 and the variation range to L=±30 is performed. The variation range L=±30 means that the range is to have a width of 30 above and below the tone value at the present point.

In the loop of steps S23 and S24 of the second round, the tone value of the primary color G is renewed by the new variation amount S=3 at a time. Thus with the above-described example, renewal is performed in the manner of: G=193, 196, 199, 202 . . . . However, since the new setting of the variation range L=±30 is made, the specific variation range is of a width of ±30 centered about the initial tone value G=193 of the second round for the primary color G and the range is thus 163 to 223. Thus in the second round, the tone value of the primary color G is varied cyclically in increments of 3 within the variation range of 163 to 223.

Likewise, in the loop of steps S25 and S26 of the second round, the tone value of the primary color B is renewed by the new variation amount S=3 at a time. Thus with the above-described example, renewal is performed in the manner of: B=231, 234, 237, 240 . . . . However, since the new setting of the variation range L=±30 is made, the specific variation range is of a width of ±30 centered about the initial tone value B=231 of the second round for the primary color B and the range is thus 201 to 261 (actually, due to the cyclic variation, the portion of 256 to 261 will be replaced by 0 to 5). The tone value of the primary color B is varied cyclically in increments of 3 within this variation range.

Such processes are executed repeatedly until it is judged in step S27 that the variation amount S has reached a predefined value. For example, if the variation amount S=1 is set as the predefined value, the renewal in step S28 is carried out and the processes of steps S23 to S26 are repeated until the variation amount S reaches 1.

Though the widths of renewal in step S28 may be set in any way as long as the variation amount S and the variation range L are reduced gradually, as a specific example, the renewal values of "10"→"3"→"1" are set for the variation amount S and the renewal values of "entire range (0 to 255)"→"±30"→"±7" are set for the variation range L. In this case, processes are carried out under the settings of S=10 and L=0 to 255 in the first round, processes are carried out under the settings of S=3 and L=±30 in the second round, processes are carried out under the settings of S=1 and L=±7 in the third round, and upon completion of the third round, it is judged that S has reached the predefined value in step S27, and step S29 is then entered.

At the point at which it is thus judged in step S27 that S has reached the predefined value, the agreement signal is provided from comparison result entering means 230 to measurement result output means 250. Then as indicated in step S29, measurement result output means 250 executes the process of outputting the respective tone values of the primary colors R, G, and B that are stored in tone value storage means 220 at that point as the measurement results Rw, Gw, and Bw.

In order to execute the measurement procedures illustrated in the flowchart of FIG. 6, tone value varying means 240 is provided with a function of starting the blue varying operation when the green approximation signal is input in the state in which the green varying operation is being performed, starting the green varying operation when the blue approximation signal is input in the state in which the blue varying operation is being performed, and repeatedly executing the green varying operation and the blue varying operation alternatingly and a function of repeatedly executing the operations while gradually reducing the tone value variation amount S and the variation range L. Also, comparison result entering means 230 is provided with a function of deeming that a comparison result indicating that the objects of comparison are matched is input and outputting the agreement signal when the inputs of both the green approximation signal and the blue approximation signal are completed after the variation amount S has reached the predefined value.

With the measurement procedures illustrated in the flowchart of FIG. 6, since the operator can be made to execute the input of the recognition of color matching repeatedly while the tone value variation amount S and the variation range L are being gradually reduced, measurement results of higher precision can be obtained in comparison to the measurement procedures illustrated in the flowchart of FIG. 5. That is, as the processes are repeated in the first round, second round, and third round, the tone values of the primary colors G and B gradually approach the optimal values. Also, since the tone value variation amount S is gradually reduced, the increment width of the varying operation is rough at first and becomes finer gradually. Furthermore, since the variation range L is gradually narrowed, the tone values are gradually narrowed down to the optimal values and efficient measurement operations are enabled.

Also with these measurement processes, the operability from the operator's viewpoint is also made extremely high. Since as mentioned above, just a mouse click suffices as the operator's operation, the tasks can be carried out while carefully viewing test pattern T and reference body Q. That is the operator just needs to repeat the task of clicking the mouse at the instant at which he/she feels that the colors of both have become closest to each other, and in the case of the above-described example, by performing a total of just six click operations in the processes of three cycles, the measurements are completed automatically. For practical use, it is preferable for some sound effect to be indicated to the operator or some message to be displayed on the screen each time a click operation is performed to make the operator recognize that measurements are being executed repeatedly six times and clearly ascertain the partition of each time of measurement.

Embodiments, wherein, of the three primary colors R, G, and B the tone value for the primary color R is always fixed at the maximum tone value of R=255 and varying operations are performed on just the tone values for the primary color G and the primary color B, were described above with reference to the flowcharts of FIGS. 5 and 6. Embodiments based on a different approach will now be described.

The different approach to be described here is based on the general human perception of color that the opposite color of red is green and the opposite color of yellow is blue. That is, based on human perception, the balance between reddish and greenish serves as one yardstick for color and the balance between yellowish and bluish serves as another yardstick for color. The present inventor has found that by using such human perception of color and making arrangements to perform a task of recognizing white from the standpoint of whether an object is reddish or greenish and a task of recognizing white from the standpoint of whether an object is yellowish or bluish, measurement tasks that better match the human perception are enabled.

That is, by varying the display color of test pattern T in the manner of gradually weakening the green from a green state, then transitioning to pale red via white, and thereafter gradually strengthening the red, or oppositely gradually weakening the red from a red state, then transitioning to pale green via white, and thereafter gradually strengthening the green, white can be recognized as being an intermediate point between red and green that is neither reddish nor greenish. This varying operation is referred to here as the "red/green varying operation." In this red/green varying operation, the color that an operator recognizes as being white has the significance of strictly being a color in which the opposite color components of red and green are neutralized.

Meanwhile, by varying the display color of test pattern T in the manner of gradually weakening the yellow from a yellow state, then transitioning to pale blue via white, and thereafter gradually strengthening the blue, or oppositely gradually weakening the blue from a blue state, transitioning to pale yellow via white, and thereafter gradually strengthening the yellow, white can be recognized as being an intermediate point between yellow and blue that is neither yellowish nor bluish. This varying operation is referred to here as the "yellow/blue varying operation." In this yellow/blue varying operation, the color that an operator recognizes as being white has the significance of strictly being a color in which the opposite color components of yellow and blue are neutralized.

Thus when the operator inputs the signal indicating the matching of colors in the state wherein the display color of test pattern T is varied by the above-described red/green varying operation and the operator furthermore inputs the signal indicating the matching of colors in the state wherein the display color is varied by the above-described yellow/blue varying operation, a color, which is neutralized in terms of both the opposite color components of red and green and the opposite color components of yellow and blue, is obtained and measurement results of high precision that are matched to the human perception of color are obtained.

To apply this approach, it suffices to modify the procedures illustrated by the flowcharts of FIGS. 5 and 6 slightly. First in step S11 of FIG. 5, the tone values of the three primary colors R, G, and B are respectively set to prescribed initial values. In this embodiment, the primary color R is also not fixed but is subject to the variation of the tone value. As in the above-described embodiment, in step S12, the measurement task is started when the pressing of start button 21 is detected. However, in step S13, in place of the green varying operation, the above-described red/green varying operation is executed. Thus when match button 22 is pressed in step S14, matching of the colors from the standpoint of the balance of the opposite color components of red and green is obtained. Here, the signal obtained by the operation of match button 22 in step S14 is referred to as the "red/green approximation signal."

Meanwhile, in step S15, in place of the blue varying operation, the above-described yellow/blue varying operation is executed. Thus when match button 23 is pressed in step S16, matching of the colors from the standpoint of the balance of the opposite color components of yellow and blue is obtained. Here, the signal obtained by the operation of match button 23 in step S16 is referred to as the "yellow/blue approximation signal." Thus when the red/green approximation signal is obtained in step S14 and the yellow/blue approximation signal is obtained in step S16, since this means that matching of the colors is obtained in regard to both the balance of the opposite color components of red and green and the balance of the opposite color components of yellow and blue, the respective tone values of the primary colors R, G, and B at that point, are output as the measurement results in the final stage in step S17.

For performing the red/green varying operation in step S13, tone value varying means 240 is provided with a function of performing the variation of adding or subtracting the prescribed variation amount to or from the tone value of the primary color R in the prescribed period or adding or subtracting the prescribed variation amount to or from the tone value of the primary color G in the prescribed period. For adjustment of the balance of the opposite color components of red and green, the tone value of the primary color R may be increased or decreased or the tone value of the primary color G may be increased or decreased. Since these are opposite colors, in adjusting the balance of the two, the varying operation of increasing the tone value of the primary color R is equivalent to the varying operation of decreasing the tone value of the primary color G, and likewise, the varying operation of increasing the tone value of the primary color G is equivalent to the varying operation of decreasing the tone value of the primary color R.

Thus for example, when as a result of gradually increasing the tone value of the primary color R, the maximum tone value is reached (for example, R=255), by then gradually decreasing the tone value of the primary color G, the variation in the same adjustment direction of strengthening the red and weakening the green can be continued in terms of visual perception. Likewise, when as a result of gradually decreasing the tone value of the primary color R, the minimum tone value is reached (for example, R=0), by then gradually increasing the tone value of the primary color G, the variation in the same adjustment direction of strengthening the green and weakening the red can be continued in terms of visual perception.

Though the red/green varying operation can thus be performed in principle by either a method of increasing or decreasing the tone value of the primary color R or a method of increasing or decreasing the tone value of the primary color G, for practical use, it is preferable to repeatedly execute the operation of varying the tone value of the primary color R and the operation of varying the tone value of the primary color G in an alternating manner. For example, the operation of gradually increasing the tone value of the primary color R and then, when the maximum tone value is reached (for example, R=255), gradually decreasing the tone value of the primary color G is performed. Then when the tone value of the primary color G reaches the minimum tone value (for example, G=0), the tone value of the primary color R is gradually decreased, and when the tone value of the primary color R reaches the minimum tone value (for example, R=0), the tone value of the primary color G is gradually increased. Then when the tone value of the primary color G reaches the maximum tone value (for example, G=255), the tone value of the primary color R is gradually increased. By thus performing the variation of the primary color R and the variation of the primary color G in an alternating manner, a test pattern, which varies cyclically and becomes reddish and greenish alternatingly in the manner of: reddish→greenish→reddish→greenish→ can be displayed to the operator and yet the tone values of the respective colors can be varied across the entire range from the maximum tone value to the minimum tone value.

Meanwhile, for performing the yellow/blue varying operation in step S15, tone value varying means 240 is provided, in principle, with a function of performing the variation of adding or subtracting the prescribed variation amount to or from the tone value of the primary color Y in the prescribed period or adding or subtracting the prescribed variation amount to or from the tone value of the primary color B in the prescribed period. For adjustment of the balance of the opposite color components of yellow and blue, the tone value of the primary color Y may be increased or decreased or the tone value of the primary color B may be increased or decreased. Since these are opposite colors, in adjusting the balance of the two, the varying operation of increasing the tone value of the primary color Y is equivalent to the varying operation of decreasing the tone value of the primary color B, and likewise, the varying operation of increasing the tone value of the primary color B is equivalent to the varying operation of decreasing the tone value of the primary color Y.

However, in actuality, since the three primary colors of a color monitor are R, G, and B and do not include the component of the primary color Y, a varying operation of directly increasing or decreasing the tone value of the primary color Y cannot be performed. Thus with the present embodiment, that the primary color Y is a mixed color of the primary color R and the primary color G is noted and the yellow/blue varying operation based on this principle is performed using the combination of the primary color R and primary color G in place of the primary color Y.

Specifically, tone value varying means 240 is provided with a function of performing the variation of adding or subtracting the same prescribed variation amount to or from the tone value of the primary color R and the tone value of the primary color G in a prescribed period or adding or subtracting a prescribed variation amount to or from the tone value of the primary color B in a prescribed period. For adjustment of the balance of the opposite color components of yellow and blue, the tone values of the primary color R and the primary color G may be increased or decreased simultaneously by the same amount (which is equivalent to increasing or decreasing the tone value of the primary color Y) or the tone value of the primary color B may be increased or decreased. Since the primary color Y (the mixed color of the primary color R and the primary color G) and the primary color B are opposite colors, in adjusting the balance of the two, the varying operation of increasing the tone values of the primary colors R and G simultaneously by the same amount is equivalent to the varying operation of decreasing the tone value of the primary color B, and likewise, the varying operation of increasing the tone value of the primary color B is equivalent to the varying operation of decreasing the tone values of the primary colors R and G simultaneously by the same amount.

Thus for example, when as a result of gradually increasing the tone values of the primary colors R and G in the manner of: (R=200, G=100)→(R=205, G=105)→(R=210, G=110)→(R=215, G=115)→ . . .,the maximum tone value is reached for at least one of the colors (for example, when R=255, G=155 is reached), by then gradually decreasing the tone value of the primary color B, for example in the manner of: B=120→115→110→105→ . . . , the variation in the same adjustment direction of strengthening the yellow and weakening the blue can be continued in terms of visual perception. Likewise, when as a result of gradually decreasing the tone values of the primary colors R and G in the manner of: (R=200, G=100)→(R=195, G=95)→(R=190, G=90)→ . . . , the minimum tone value is reached for at least one of the colors (for example, when R=100, G=0 is reached), by then gradually increasing the tone value of the primary color B, for example in the manner of: B=120→125→130→135→ . . . , the variation in the same adjustment direction of strengthening the blue and weakening the yellow can be continued in terms of visual perception.

Though the yellow/blue varying operation can thus be performed in principle by either a method of increasing or decreasing the tone values of the primary colors R and G simultaneously by the same amount or a method of increasing or decreasing the tone value of the primary color B, for practical use, it is preferable to repeatedly execute the operation of varying the tone values of the primary colors R and G simultaneously by the same amount and the operation of varying the tone value of the primary color B in an alternating manner. For example, the operation of gradually increasing the tone values of the primary color R and G simultaneously by the same amount and then, when the tone value of either color reaches the maximum tone value (for example, R=255), gradually decreasing the tone value of the primary color B is performed. Then when the tone value of the primary color B reaches the minimum tone value (for example, B=0), the tone values of the primary colors R and G are gradually decreased simultaneously by the same amount, and when the tone value of either color reaches the minimum tone value (for example, G=0), the tone value of the primary color B is gradually increased. Then when the tone value of the primary color B reaches the maximum tone value (for example, B=255), the tone values of the primary colors R and B are gradually increased simultaneously by the same amount. By thus performing the variation of the primary colors R and G and the variation of the primary color B in an alternating manner, a test pattern, which varies cyclically and becomes yellowish and bluish alternatingly in the manner of: yellowish→bluish→yellowish→bluish→ can be displayed to the operator and yet the tone values of the respective colors can be varied across the entire range from the maximum tone value to the minimum tone value.

Thus in the present embodiment, comparison result entering means 230 has a function of inputting, from the operator, the red/green approximation signal, indicating that the color of reference body Q and the color of test pattern T have become closest to each other, in the state in which tone value varying means 240 is performing the red/green varying operation and inputting the yellow/blue approximation signal, indicating that the color of reference body Q and the color of test pattern T have become closest to each other, in the state in which tone value varying means 240 is performing the yellow/blue varying operation, and deems that the comparison result indicating that the objects of comparison are matched is input when both the red/green approximation signal and the yellow/blue approximation signal have been input.

The same approach can obviously be applied to the embodiment illustrated by the flowchart of FIG. 6. That is, in step S21, the tone values of the three primary colors R, G, and B are respectively set to the prescribed initial values, and arrangements are made to perform the above-described red/green varying operation in place of the green varying operation in step S23 and input the red/green approximation signal upon click operation in step S24. Likewise, arrangements are made to perform the above-described yellow/blue varying operation in place of the blue varying operation in step S25 and input the yellow/blue approximation signal upon click operation in step S26. Tone value varying means 240 thus starts the yellow/blue varying operation at the point at which the red/green approximation signal is input (step S24) in the state of performing the red/green varying operation (step S23) and starts the red/green varying operation at the point at which the yellow/blue approximation signal is input (step S26) in the state of performing the yellow/blue varying operation (step S25) to repeatedly execute the red/green varying operation and the yellow/blue varying operation alternatingly and repeatedly execute these processes while gradually reducing the tone value variation amount and the variation range. Also, comparison result entering means 230 deems that a comparison result indicating that the objects of comparison are matched is input when the inputs of both the red/green approximation signal and the yellow/blue approximation signal are completed after the variation amount has reached the predefined value.

There are a few points to be noted in carrying out a cyclic variation or a reciprocating variation shown in FIG. 3 in the yellow/blue varying operation. Firstly, when, in carrying out a cyclic variation, the tone value of at least one of either the primary color R or the primary color G exceeds the maximum tone value, a process of cycling the smaller of the tone value of the primary color R and the tone value of the primary color G to the minimum tone value side and yet keeping the difference between the two tone values fixed is performed. For example, when, in the state in which the variation range is set to 0 to 255, the tone values are gradually increased in the manner of: (R=200, G=100)→(R=205, G=105)→(R=210, G=110)→(R=215, G=115)→ . . . and (R=255, G=155) is reached, since the tone value of the primary color R will then exceed the maximum tone value, the smaller tone value of the primary color G (G=155) is cycled to the minimum tone value side and set, for example, to 0. The other tone value of the primary color R is set to 100 so that the difference with respect to the tone value of the primary color G will be fixed. By doing so, the cyclic variation can be carried out while constantly maintaining the difference of the tone values of the primary colors R and G at 100. Likewise, when the tone value of at least one of either the primary color R or the primary color G falls below the minimum tone value, a process of cycling the larger of the tone value of the primary color R and the tone value of the primary color G to the maximum tone value side and yet keeping the difference between the two tone values fixed is performed.

Also, when in carrying out reciprocating variation, the tone value of at least one of either the primary color R or the primary color G exceeds the maximum tone value, a foldback process of switching to a varying operation of subtracting the variation amount is performed on both the tone value of the primary color R and the tone value of the primary color G. For example, when in the state in which the variation range is set to 0 to 255, the tone values are gradually increased in the manner of: (R=200, G=100)→(R=205, G=105)→(R=210, G=110)→(R=215, G=115)→ . . . and (R=255, G=155) is reached, since the tone value of the primary color R will then exceed the maximum tone value, the varying operation is switched to that with which both of the tone values are decreased in the manner of: (R=250, G=150)→(R=245, G=145)→(R=240, G=140)→ . . . . By doing so, the reciprocating variation can be carried out while constantly maintaining the difference of the tone values of the primary colors R and G at 100. Likewise, when the tone value of at least one of either the primary color R or the primary color G falls below the minimum tone value, a fold-back process of switching to a varying operation of adding the variation amount is performed on both the tone value of the primary color R and the tone value of the primary color G.

As described above, with this invention's white chromaticity measuring device for color monitor, the white chromaticity, in which the illumination environment of the installation location is considered, can be measured readily for each individual color monitor.

INDUSTRIAL APPLICABILITY

This invention's white chromaticity measuring device for color monitor can be used widely in fields in which image processing by a computer is carried out. It is especially optimal for use in the field of DTP processing in which several staff members must perform tasks of preparing commercial printed matter while viewing color monitors that are respectively installed in specific environments.

The invention claimed is:

1. A device (200) for measuring a white chromaticity of a color monitor (100), having a function of displaying color images using the three primary colors of R, G, and B, the white chromaticity measuring device for color monitor comprising:

a tone value storage means (220), storing a combination of tone values of the three primary colors R, G, and B;

a test pattern display means (210), displaying a test pattern (T) on a screen of a color monitor based on the tone values of the three primary colors R, G, and B that are stored in the tone value storage means;

a tone value varying means (240), performing a varying operation of varying, with time and in accordance with prescribed rules that are determined in advance, the tone values stored in the tone value storage means;

a comparison result entering means (230), inputting, from an operator viewing the test pattern displayed on the screen of the color monitor in a state in which the varying operation by the tone value varying means is being performed, a comparison result, for which a color of a "reference body indicating white that serves as a reference" (Q) that is positioned near the test pattern and a color of the test pattern are the objects of comparison; and a measurement result output means (250), outputting, as a measurement result indicating the white chromaticity of the color monitor under a present illumination environment and based on the reference body, the combination of the tone values of the three primary colors R, G, and B that are stored in the tone value storage means at a point at which a comparison result, indicating that the objects of comparison are matched, is input into the comparison result entering means.

2. The measuring device according to claim 1, wherein the tone value varying means (240) has a function of starting and stopping, in accordance with variation instructions provided from an operator, a varying operation of adding or subtracting a prescribed variation amount to or from a tone value of a prescribed primary color in a prescribed period.

3. The measuring device according to claim 1, wherein the tone value varying means (240) keeps a tone value of the primary color R, among the three primary colors R, G, and B, fixed always at a maximum tone value and carries out the varying operations only on tone values of the primary color G and the primary color B.

4. The measuring device according to claim 1, wherein the tone value varying means (240) has a function of performing a varying operation of adding or subtracting a prescribed variation amount to or from a tone value of a specific primary color to be varied in a prescribed period and switching the specific primary color to be subject to variation in accordance with the comparison result input into the comparison result entering means (230).

5. The measuring device according to claims 1, wherein the tone value varying means (240) is provided with a function of selectively performing a green varying operation of adding or subtracting a prescribed variation amount to or from a tone value of the primary color G in a prescribed period and a blue varying operation of adding or subtracting a prescribed variation amount to or from a tone value of the primary color B in a prescribed period, and the comparison result entering means (230) is provided with a function of inputting, from an operator, a green approximation signal, indicating that the color of the reference body and the color of the test pattern have become closest to each other, in a state in which the tone value varying means is performing the green varying operation, and a blue approximation signal, indicating that the color of the reference body and the color of the test pattern have become closest to each other, in a state in which the tone value varying means is performing the blue varying operation, and deeming that a comparison result, indicating that the objects of comparison are matched, has been input when both the green approximation signal and the blue approximation signal are input.

6. The measuring device according to claim 5, wherein in performing the varying operation, a variation range of a tone value is set, and the tone value is varied cyclically within the variation range in a manner such that when the tone value obtained by the varying operation of adding the variation amount exceeds a maximum tone value of the variation range, a cyclic operation of incrementing from a minimum tone value side of the variation range is performed, and when the tone value obtained by the varying operation of subtracting the variation amount falls below the minimum tone value of the variation range, a cyclic operation of decrementing from the maximum tone value side of the variation range is performed.

7. The measuring device according to claim 6, wherein the tone value varying means (240) is provided with a function of stalling the blue varying operation when the green approximation signal is input in a state in which the green varying operation is being performed, starting the green varying operation when the blue approximation signal is input in a state in which the blue varying operation is being performed, and repeatedly executing the green varying operation and the blue varying operation altenatingly and a function of repeatedly executing the operations while gradually reducing the tone value variation amount and the variation range, and the comparison result entering means (230) is provided with a function of deeming that a comparison result indicating that the objects of comparison are matched is input when inputs of both the green approximation signal and the blue approximation signal are completed after the variation amount has reached a predefined value.

8. The measuring device according to claim 5, wherein in performing the varying operation, a variation range of a tone value is set, and the tone value is varied reciprocatingly within the variation range in a manner such that when the tone value obtained by the varying operation of adding the variation amount exceeds a maximum tone value of the variation range, a fold-back operation of switching to the varying operation of subtracting the variation amount from the maximum tone value side is performed, and when the tone value obtained by the varying operation of subtracting the variation amount falls below a minimum tone value of the variation range, a fold-back operation of switching to the varying operation of adding the variation amount from the minimum tone value side is performed.

9. The measuring device according to claim 8, wherein the tone value varying means (240) is provided with a function of starting the blue varying operation when the green approximation signal is input in a state in which the green varying operation is being performed, starting the green varying operation when the blue approximation signal is input in a state in which the blue varying operation is being performed, and repeatedly executing the green varying operation and the blue varying operation alternatingly and a function of repeatedly executing the operations while gradually reducing the tone value variation amount and the variation range, and the comparison result entering means (230) is provided with a function of deeming that a comparison result indicating that the objects of comparison are matched is input when inputs of both the green approximation signal and the blue approximation signal are completed after the variation amount has reached a predefined value.

10. The measuring device according to claim 1, wherein the tone value varying means (240) is provided with a function of selectively performing a red/green varying operation, in which a prescribed variation amount is added or subtracted to or from a tone value of the primary color R in a prescribed period or a prescribed variation amount is added or subtracted to or from a tone value of the primary color G in a prescribed period, and a yellow/blue varying operation, in which a prescribed variation amount of the same value is added or subtracted to or from a tone value of the primary color R and a tone value of the primary color G simultaneously in a prescribed period or a prescribed variation amount is added or subtracted to or from a tone value of the primary color B in a prescribed period, and the comparison result entering means (230) is provided with a function of inputting, from an operator, a red/green approximation signal, indicating that the color of the reference body and the color of the test pattern have become closest to each other, in a state in which the tone value varying means is performing the red/green varying operation, and a yellow/blue approximation signal, indicating that the color of the reference body and the color of the test pattern have become closest to each other, in a state in which the tone value varying means is performing the yellow/blue varying operation, and deeming that a comparison result, indicating that the objects of comparison are matched, has been input when both the red/green approximation signal and the yellow/blue approximation signal are input.

11. The measuring device according to claim 10, wherein in performing the red/green varying operation, a first operation of varying the tone value of the primary color R and a second operation of varying the tone value of the primary color G are alternatingly executed repeatedly, and in performing the yellow/blue varying operation, a third operation of varying the tone values of the primary color R and the primary color G and a fourth operation of varying the tone value of the primary color B are alternatingly executed repeatedly.

12. The measuring device according to claim 11, wherein the tone value varying means (240) is provided with a function of starting the yellow/blue varying operation when the red/green approximation signal is input in a state in which the red/green varying operation is being performed, starting the red/green varying operation when the yellow/blue approximation signal is input in a state in which the yellow/blue varying operation is being performed, and repeatedly executing the red/green varying operation and the yellow/blue varying operation alternatingly and a function of repeatedly executing the operations while gradually reducing the tone value variation amount and the variation range, and the comparison result entering means (230) is provided with a function of deeming that a comparison result indicating that the objects of comparison are matched is input when inputs of both the red/green approximation signal and the yellow/blue approximation signal are completed after the variation amount has reached a predefined value.

13. The measuring device according to claim 10, wherein in performing the varying operation, a variation range of a tone value is set, and the tone value is varied cyclically within the variation range in a manner such that when the tone value obtained by the varying operation of adding the variation amount exceeds a maximum tone value of the variation range (in the case where the primary color R and the primary color G are varied simultaneously, when a tone value of at least one of the primary color R and the primary color G exceeds the maximum tone value), a cyclic operation of incrementing from a minimum tone value side of the variation range is performed (in the case where the primary color R and the primary color G are varied simultaneously, a process of cycling a smaller of the tone value of the primary color R and the tone value of the primary color G to the minimum tone value side and a process of keeping a difference between the two tone values fixed are performed), and when a tone value obtained by the varying operation of subtracting the variation amount falls below the minimum tone value of the variation range (in the case where the primary color R and the primary color G are varied simultaneously, when a tone value of at least one of the primary color R and the primary color G falls below the minimum tone value), a cyclic operation of decrementing from the maximum tone value side of the variation range is performed (in the case where the primary color R and the primary color G are varied simultaneously, a process of cycling a larger of the tone value of the primary color R and the tone value of the primary color G to the maximum tone value side and a process of keeping a difference between the two tone values fixed are performed).

14. The measuring device according to claim 13, wherein the tone value varying means (240) is provided with a function of starting the yellow/blue varying operation when the red/green approximation signal is input in a state in which the red/green varying operation is being performed, starting the red/green varying operation when the yellow/blue approximation signal is input in a state in which the yellow/blue varying operation is being performed, and repeatedly executing the red/green varying operation and the yellow/blue varying operation alternatingly and a function of repeatedly executing the operations while gradually reducing the tone value variation amount and the variation range, and the comparison result entering means (230) is provided with a function of deeming that a comparison result indicating that the objects of comparison are matched is input when inputs of both the red/green approximation signal and the yellow/blue approximation signal are completed after the variation amount has reached a predefined value.

15. The measuring device according to claim 10, wherein in performing the varying operation, a variation range of a tone value is set, and the tone value is varied reciprocatingly within the variation range in a manner such that when the tone value obtained by the varying operation of adding the variation amount exceeds a maximum tone value of the variation range (in the case where the primary color R and the primary color G are varied simultaneously, when a tone value of at least one of the primary color R and the primary color G exceeds the maximum tone value), a fold-back operation of switching to the varying operation of subtracting the variation amount from the maximum tone value side is performed, and when a tone value obtained by the varying operation of subtracting the variation amount falls below a minimum tone value of the variation range (in the case where the primary color R and the primary color G are varied simultaneously, when a tone value of at least one of the primary color R and the primary color G falls below the minimum tone value), a fold-back operation of switching to the varying operation of adding the variation amount from the minimum tone value side is performed.

16. The measuring device according to claim 15, wherein the tone value varying means (240) is provided with a function of starting the yellow/blue varying operation when the red/green approximation signal is input in a state in which the red/green varying operation is being performed, starting the red/green varying operation when the yellow/blue approximation signal is input in a state in which the yellow/blue varying operation is being performed, and repeatedly executing the red/green varying operation and the yellow/blue varying operation alternatingly and a function of repeatedly executing the operations while gradually reducing the tone value variation amount and the variation range, and the comparison result entering means (230) is provided with a function of deeming that a comparison result indicating that the objects of comparison are matched is input when inputs of both the red/green approximation signal and the yellow/blue approximation signal are completed after the variation amount has reached a predefined value.

* * * * *